Dec. 6, 1966

R. E. BYINGTON  3,290,591

COHERENT FILTER SPECTRUM ANALYZER INCLUDING
DUAL RECIRCULATING LOOPS

Filed April 25, 1963

INVENTOR
ROY E. BYINGTON

BY Herbert W. Arnold
ATTORNEY

Dec. 6, 1966  R. E. BYINGTON  3,290,591
COHERENT FILTER SPECTRUM ANALYZER INCLUDING
DUAL RECIRCULATING LOOPS
Filed April 25, 1963
2 Sheets-Sheet 2

INVENTOR
ROY E. BYINGTON
BY Herbert W. Arnold
ATTORNEY

United States Patent Office 3,290,591
Patented Dec. 6, 1966

3,290,591
COHERENT FILTER SPECTRUM ANALYZER INCLUDING DUAL RECIRCULATING LOOPS
Roy E. Byington, Sudbury, Mass., assignor to Raytheon Company, Lexington, Mass., a corporation of Delaware
Filed Apr. 25, 1963, Ser. No. 275,633
15 Claims. (Cl. 324—77)

This invention relates to a spectrum analyzer for scanning a band of signal frequencies to determine the frequency spectrum of any signal appearing in the band of frequency scanned.

It is often desired to obtain real-time, fine-resolution, spectrum analysis of input signals. A coherent memory filter, sometimes known as a circulating memory integrator, is particularly suited for such spectrum analysis. The coherent memory filter is an active time-variable network which generates, in response to any arbitrary input signal, an output signal which is a close approximation of the frequency spectrum of the input signal.

In general, a coherent memory filter comprises a circulating trigger loop and a signal loop. The signal loop performs the frequency scanning filter function by recirculating an input signal through a closed loop circuit comprising a vectorial adder circuit, a time delay circuit and a frequency shifting circuit. The time delay circuit delays an applied signal by a fixed amount each time it circulates through the loop. The frequency shifting circuit shifts the frequency of an applied signal up or down by a fixed amount each time it circulates through the loop. The vectorial adder circuit continuously adds the input signal to that portion of the input signal already circulating in the loop. The output of the coherent memory filter comprises the vectorially added signals. Such output signal is equivalent to having passed the input signal through a frequency scanning or swept comb filter and the resulting output signal when displayed on suitable amplitude versus time display apparatus comprises a signal having peak amplitudes spaced apart in time corresponding to the frequency content of the input signal.

The circulating trigger loop periodically establishes the phase of the frequency shift signal oscillations at an arbitrary fixed value once every circulation time delay period. The circulating trigger loop circulates pulses through a closed loop comprising a pulse generator, the signal loop delay line and a trigger detector. The pulse generator provides a first pulse which is circulated through the signal loop delay line, detected by the trigger detector and applied to the pulse generator so as to retrigger the pulse generator and produce a second pulse to be circulated through the signal loop delay line. In this manner a train of pulses is produced having a pulse repetition rate proportional to the signal loop delay time. A portion of the pulse train signal is coupled to a frequency generator external of the circulating trigger loop. The frequency generator selects a harmonic of the pulse train repetition rate so as to derive the aforementioned frequency shift signal. Alternatively, the frequency generator may comprise an oscillator which is triggered into oscillation each time a pulse generator is applied. In either case it will be shown that the output signal from the frequency generator comprises an oscillator signal of periodically fixed phase value.

In order to obtain optimum frequency resolution of input signals the signal loop delay line should be nondispersive, that is to say, the delay line should delay all input frequency signals by the same amount of time. Uniformity of time delay is necessary so that the input signal circulated in the signal loop is added to the input signal at the vectorial adder circuit in a proper phase relationship independent of the number of circulations. Since the input signal is successively shifted up or down in frequency during each circulation through the loop, to obtain proper phase relation independent of the number of circulations, the delay line should delay all frequencies uniformly.

Presently available delay line devices are incapable of responding uniformly to all frequencies. For example, a quartz delay line is a typical device presently used to obtain the requisite time delay in coherent memory filters. P. M. Sutton in an article entitled, "Propagation of Sound in Plate-Shaped Solid Delay Lines," which appeared in the January, 1959, edition of "The Journal of Acoustical Sources of America," determined the phase velocity of a continuous wave signal in a quartz delay medium as being proportional to the free medium shear velocity times the square root of one plus a constant, times the square of the wavelength $\lambda$ of the signal divided by the thickness of the quartz medium. From this relationship it can be seen that the velocity, and hence the reciprocal of time delay, with which the signal traverses the medium is directly proportional to the wavelength, and hence inversely proportional to the frequency, of the input signal. The quartz medium will pass lower frequency signals faster than higher frequency signals, thereby making the phase relationship of the signals added in the vectorial adder circuit dependent on the frequency spectrum of the applied signal and hence the number of circulations through the loop.

In order to compensate for frequency dispersion in the time delay device attempts have been made to provide a filter circuit, at the output of the delay line, having a frequency versus time delay response characteristic which is inverse to that of the delay line device. Such attempts have not been commercially successful because of the expense and difficulty necessitated in matching the delay line characteristic.

In the present invention the effect of delay line dispersion is compensated for by providing an additional time delay in the circulating trigger loop. In a specific embodiment of the invention, this time delay is proportional to the ratio of the input frequency $F_o$ to the shift frequency $F_s$ times the ratio of the variation in time delay across the frequency spectrum to the desired number of circulations of the input signal. The additional time delay apparatus may comprise, for example, an inexpensive lumped constant delay line structure or a length of coaxial cable. Furthermore, as the number of circulations increases the time delay required becomes smaller, in which case a simple resistance capacitance network will provide the requisite delay. For example, in a typical application with an input frequency $F_o$ of 30 megacycles, a shift frequency $F_s$ of 176 kilocycles and $m$ equal to 40 circulations, the time delay required to compensate for dispersion in the quartz delay line equalled 20 nanoseconds.

Other objects and advantages of this invention will become apparent from the following specification taken in connection with the accompanying drawings in which:

FIG. 1 is a block diagram of one embodiment of the present invention;

FIG. 2 graphically illustrates certain principles of the invention;

Figure 1:
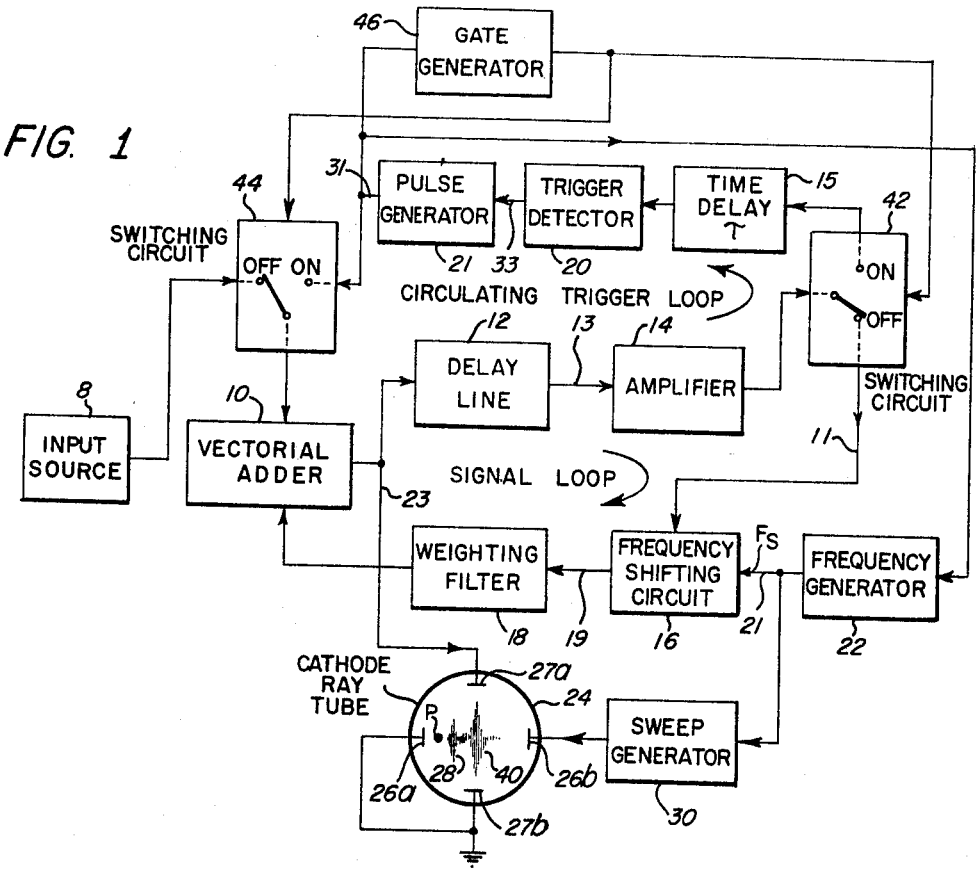
Figure 3:
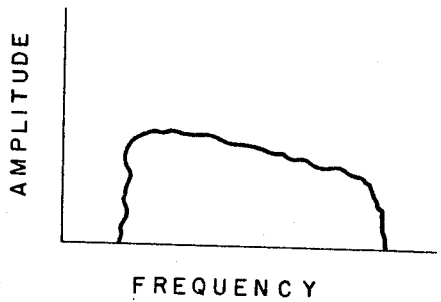
FIG. 3 illustrates the frequency response of a weighting filter circuit.

In FIG. 1 there is illustrated a spectrum analyzer of the invention in which an input signal to be analyzed is coupled from input source 8 to a switching circuit 44 such as a diode switch. Switching circuit 44 is operated by the voltage output of gate generator 46 which in turn is controlled by pulses from pulse generator 21. Switching circuits 44 and 42 are required to prevent interference between signal loop signals and circulating trigger loop signals. When the output of gate generator 46 is below a certain value as shown in the waveform diagram of FIG. 4, switching circuit 44 is in the "off" condition, depicted schematically in dotted lines within the switching circuit device designated "44." In the "off" condition of circuit 44 the input signal from source 8 is coupled to a conventional vectorial adder or summing circuit 10 to be added with other signals which will be subsequently described. The output of the adder circuit 10 is coupled to a delay line device 12. Delay line device 12 comprises, for example, a quartz medium, magnetostrictive delay line or a series of lumped circuit elements adapted to respond to an input signal so as to produce an output signal at lead 13 "T" seconds later. The time delayed signals on lead 13 are amplified in amplifier 14 to a suitable level before being coupled through the "off" condition of switching circuit 42 to frequency shifting circuit 16. The frequency shifting circuit 16 is controlled by the signal $F_s$ from frequency generator 22 available on lead 21 and connected to a second input of the frequency shifting circuit 16. The signal $F_s$ is derived in a manner subsequently described in connection with the circulating trigger loop of FIG. 1. Frequency shifter 16 shifts or changes the frequency of the input signals on line 11 from amplifier 14 by a fixed amount $F_s$ so as to provide an output signal at line 19 proportional to the input frequency signals plus $F_s$. A suitable frequency shifting circuit is the well known heterodyner or mixer circuit. In a mixer circuit sum and difference products are derived in the mixer and the desired product such as the sum signal is filtered out through a filter. Although the apparatus of the invention performs equally as well with either the sum or the difference product, for simplicity of discussion it is assumed herein that the sum product is passed in frequency shift circuit 16 so that its input is shifted up in frequency an amount $F_s$. The time delayed and frequency shifted signals at output lead 19 of frequency shifting circuit 16 are coupled to weighting filter 18. Weighting filter 18 is a bandpass filter having an amplitude vs. frequency response characteristic as shown in FIG. 3. As can be seen in FIG. 3, the weighting filter 18 has a slightly drooped amplitude vs. frequency characteristic so that lower frequency signals are attenuated less than higher frequency signals. Furthermore, signals outside the bandpass characteristic of weighting filter 18 are completely suppressed so that the weighting filter 18 operates to effectively block recirculations through the signal loop after the desired number of circulations has been attained. The output of weighting filter 18 is coupled to the vectorial adder circuit 10 to be combined vectorially with the input signal being applied from the input source. The added signals are then recirculated through time delay circuit 12, amplifier 14, shifted in frequency an additional amount $F_s$ by circuit 16, passed through filter 18 and applied to vectorial adder 10 for a second addition with the input signal from source 8. It can thus be seen that the apparatus so far described constitutes a closed or recirculating signal loop which performs a time delay and frequency shift function. The output signal from the signal loop may be taken from any point in the loop such as line 23. The output signal available on lead 23 is equivalent to the input signal from source 8 modified by having been passed through a scanning comb filter and being shifted in frequency by a frequency $n/2\ F_s$ where $n$ is the number of circulations of the input signal and $F_s$ is the frequency shift or offset frequency derived from frequency generator 22. The frequency gain characteristic of the signal loop determines the number of circulations and the weighting of the component signals in the output. When the filter weighting coefficients are equal to unity the filter function becomes a $$\frac{\sin \pi(n+1)X}{\sin \pi X}$$

time function. By displaying the envelope of the signal on lead 23 on a cathode ray tube 24 whose sweep frequency is synchronized to the shift frequency $F_s$ from frequency generator 22, the resultant display will be a signal conforming to the aforementioned filter function centered on a position corresponding to the frequency of the input signal. If the frequency of the input signal is changed the displayed filter function shifts to a new position corresponding to the new input signal frequency. Cathode ray tube 24 is a well-known display device having vertical deflection elements 27A and 27B and horizontal deflection elements 26A and 26B. The signal loop output signal on line 23 is coupled to vertical deflection element 27A. A portion of the frequency generator signal $F_s$ is coupled to a sweep generator 30 which generates a periodic sweep signal, such as a saw-tooth wave synchronized with the frequency $F_s$, of the oscillations from frequency generator 22. The resultant trace developed on the face of the cathode ray oscilloscope 24 is shown to comprise a signal indication such as 40. The amplitude of the signal indication 40 is proportional to the amplitude of the input signal and the displacement of the indicator signal 40 from calibrated reference frequency point P on the face of cathode ray tube 24 identifies the frequency of the input signal. If the input signal also contains a component of a different frequency and a different amplitude, the different frequency would appear as shown at 28. This completes the description of the signal loop of FIG. 1.

Figure 4:
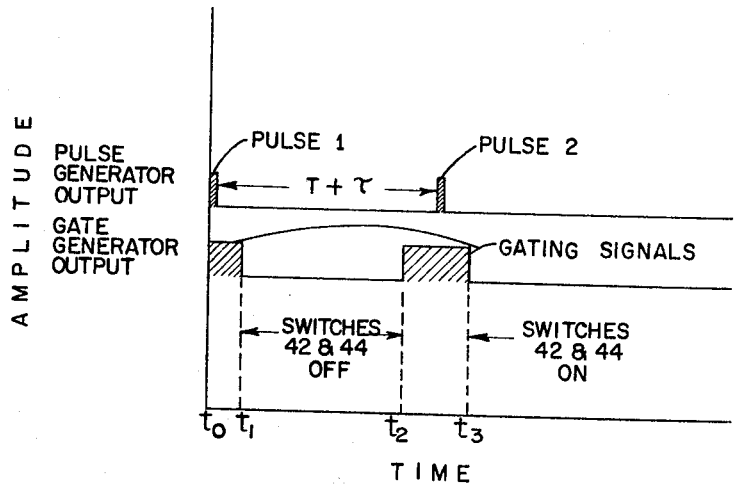
FIG. 4 is a timing diagram of certain switching features of the invention.

Referring now to the circulation trigger loop of FIG. 1, such loop is seen to comprise delay line circuit 15, trigger detector 20 and pulse generator 21. The circulation trigger loop provides a train of pulses from which a suitable harmonic of the pulse train repetition rate is selected by frequency generator 22 to derive the desired frequency signal $F_s$. At time $t_0$ pulse generator 21 generates a first pulse signal as shown on the waveform diagram of FIG. 4, which is coupled to the aforementioned switching circuit 44. Simultaneously, the pulse output of the pulse generator triggers gate generator 46 which in turn provides a gating signal as shown in FIG. 4 to switching circuit 44. The gating signal actuates switching circuit 44, placing the circuit in the "on" mode, thereby permitting the first pulse to pass to vectorial adder 10 and preventing the input signal from source 8 from being coupled to adder 10 until at some time later $t_1$, determined by the time constants of the gate generator circuit, the gating signal is removed.

From vectorial adder 10 the pulse generator pulse is delayed in delay line 12, amplified in amplifier 14 and coupled to switching circuit 42. Switching circuit 42 is also in the "on" mode by virtue of the gating signal from gate generator 46 and thus the delayed pulse is passed through switching circuit 42 to time delay device 15 and additionally delayed a time period $\tau$ before being applied to trigger detector 20. Delay device 15 in accordance with the invention compensates for the adverse effect on system performance caused by dispersion in delay line 12. The operation of delay line 15 in connection with compensation of delay line dispersion will be explained in detail in subsequent paragraphs, but at this point it should be mentioned that delay line 15 could be placed at any point within the circulating trigger loop such as line 33 or line 31 without degradation of performance. Trigger detector 20 detects the delayed pulse and derives a trigger therefrom. The trigger from trigger detector 20 is coupled to pulse generator 21 which in response to the trigger generates a second pulse as shown in FIG. 4 which is coupled to vectorial adder 10 in the same manner as the first pulse and recirculated through the circulation trigger loop. It can thus be seen that an output will be provided at output line 31 from pulse generator 21 which comprises a series of pulses separated in time a period $T+\tau$ seconds as shown in FIG. 4. A suitable harmonic of the repetition period of such train of pulses is selected by frequency generator 22 and coupled therefrom along lead 21 to provide the aforementioned frequency shifting signal $F_s$.

This completes the general description of the circulating trigger loop. The following paragraphs relate to specific details of the additional delay device 15.

The effect of delay line dispersion on spectrum analysis and the compensating effect of a small delay $\tau$ in the circulating trigger loop can best be explained by a mathematical analysis of the signal inputs and outputs.

The input signal is defined by the equation:

$$V_1 = \cos(\varpi_0 t + \theta_0)$$

wherein $\varpi_0$ is the radial carrier frequency of the input signal from source 8 and $\theta_0$ is the carrier phase angle of the signal from source 8 at some time "$t$" equal to zero.

The frequency shift signal waveform from frequency generator 22 is defined by the equation:

$$V_s = \cos(\varpi_s t + A)$$

wherein $\varpi_s$ is the radial frequency of the frequency shift signal and $A$ is the arbitrary phase angle of such signal at the time "$t$" equals zero.

Figure 2:
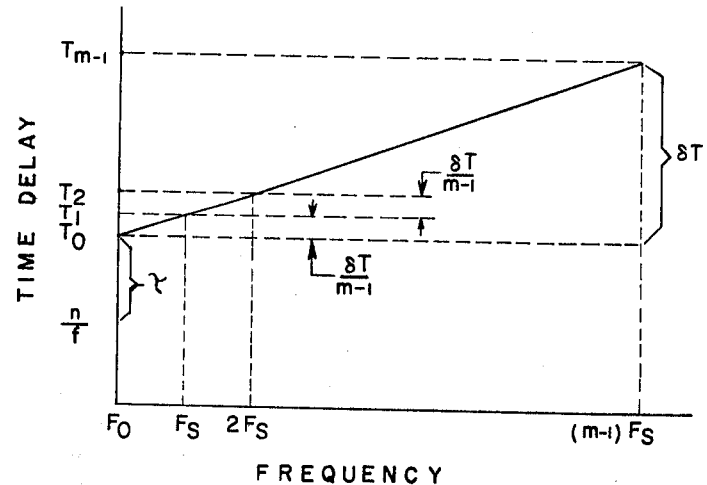

The time delay versus frequency response of a typical delay line 12 is shown in FIG. 2. $\delta T$ is the undesired variation in time delay across the band of interest in the coherent memory filter of FIG. 1. $\tau$ is the difference between a multiple of the frequency generator period and the delay at $F_0$ (the input carrier frequency signal from source 8). "$m$" is the number of signal samples to be added in adder 10, "$n$" is an integer, and $F_s$ is the frequency of the frequency generator or shift frequency signal. At this point it is noted that, as shown in FIG. 2, the difference in time delay caused by delay line dispersion between any two successive circulations equals $\delta T/m-1$.

At the time of occurrence of the $m$th input signal the component of the output which has not been circulated is defined by the equation:

$$V_0 = G_0 \cos(\varpi_0 t + \theta_0)$$

wherein $G_0$ is the weighting factor applied to the uncirculated term.

The component which has circulated once is:

$$V_1 = G_1 \cos[\omega_0(t - T_0) + \omega_s t + \theta_0 + A]$$

The component which has circulated twice is:

$$V_2 = G_2[\cos \omega_0(t - T_0 - T_1) + \omega_s(t - T_1) + \omega_s t + \theta_0 + 2A]$$

The third component is:

$$V_3 = G_3 \cos[\omega_0(t - T_0 - T_1 - T_2) + \omega_s(t - T_1 - T_2) + \omega_s(t - T_2) + \omega_s t + \theta_0 + 3A]$$

After K circulations, the Kth component is defined as:

Equation I $$V_k = G_k \cos\left[\omega_0\left(t - \sum_{i=0}^{K-1} T_i\right) + \omega_s\left(Kt - \sum_{i=0}^{K-1} iT_i\right) + \theta_0 + KA\right]$$

wherein $G_K$ is the weighting factor applied to the Kth term by weighting filter 18 and "$i$" is the number of circulations.

From FIG. 2 it can be seen that $$T_i = T_0 + \frac{i\delta T}{m-1}$$

Since $T_0$ by definition equals $n/F_s + \tau$, $T_i$ is approximately equal to:

$$\frac{n}{F_s} + \tau + \frac{i\delta T}{m-1}$$

By substituting the above term for $T_0$ in Equation I, Equation II is obtained wherein:

Equation II $$V_k = G_k\left\{\cos \omega_0\left(t - \frac{Kn}{F_s} - K\tau - \sum_{i=1}^{K-1} i\frac{\delta T}{m-1}\right) + \omega_s\left[Kt - \sum_{i=1}^{K-1}\left(\frac{in}{F_s} + i\tau\right) - \frac{\delta T}{m-1}\left(\sum_{i=1}^{K-1} i^2\right)\right] + \theta_0 + KA\right\}$$

By converging the progressions in Equation II, $V_k$ becomes as follows:

Equation III $$V_k = G_k \cos\left\{(\omega_0 + K\omega_s)t - K\omega_0\left(\frac{n}{F_s} + \tau\right) + \left(\frac{K[K-1]}{2}\right)\left(\frac{-\omega_0\delta T}{m-1} - \omega_s\left[\frac{n}{F_s} + \tau\right]\right) + \left(\frac{K[K-1][2K-1]}{6}\right)\left(\frac{-\omega_s\delta T}{m-1} + \theta_0 + KA\right)\right\}$$

Since $$\frac{\omega_s n}{F_s} = 2\pi n$$

or 0 degrees, the terms in Equation III can be summed to obtain Equation IV defining the total output voltage on line 23:

Equation IV $$V_s = \sum_{K=0}^{m=1} G_k \cos\left\{(\omega_0 + K\omega_s)t - K\omega_0 T_0 + \left(\frac{K[K-1]}{2}\right)\left(\frac{-\omega_0\delta T}{m-1} - \omega_s\tau\right) + \left(K\frac{[K-1][2K-1]}{6}\right)\left(\frac{-\omega_s\delta T}{m-1}\right) + \theta_0 + KA\right\}$$

By analyzing Equation IV it can be seen that the $$\frac{K[K-1]}{2}$$

term and the $$\frac{K[K-1][2K-1]}{6}$$

term are the only terms which introduce the dispersion quantity $\delta T$ into the equation for the output signal. In accordance with the invention it has been found that by introducing a time delay $\tau$ equal to $$\frac{+\omega_0}{\omega_s}\left(\frac{\delta T}{m-1}\right)$$

into the recirculating trigger loop the effect of such dispersion quantity $\delta T$ can be compensated for to a large degree. This becomes apparent when it is realized that with $\tau$ equal to $$\frac{+\omega_0}{\omega_s}\left(\frac{\delta T}{m-1}\right)$$

the $$\frac{K[K-1]}{2}$$

term in Equation IV equals zero. In terms of relative magnitude, this $$\frac{K[K-1]}{2}$$

term is normally much larger than the $$\frac{K[K-1][2K-1]}{6}$$

term. For example, with a coherent memory filter operating characteristic of 50 circulations and $\omega_0$ of much higher frequency that $\omega_s$ the $$\frac{K[K-1]}{2}$$

term is ten times larger than the $$\frac{K[K-1][2K-1]}{6}$$

term. Furthermore, if $\tau$ is made slightly larger than $$\frac{+\omega_0}{\omega_s}\left(\frac{\delta T}{m-1}\right)$$

then a portion of the $$\frac{K[K-1][2K-1]}{6}$$

term will also be compensated for.

Physically, the appropriate value of $\tau$ is introduced into the circulating trigger loop by providing time delay device 15, intermediate amplifier 14 and trigger detector 20. At this point in the loop the signal from amplifier 14 has not been detected and delay device 15 herein may comprise a suitable length of coaxial cable. If the delay line device 15 is introduced into the circuit after detection, the signal is no longer at a high frequency and device 15 may then comprise suitable R-C circuits. Thus, all signals passing through the circulating loop are delayed an additional amount $\tau$ seconds which is sufficient to compensate for the aforementioned undesired effect of unequal time delay in delay line 12.

If the coherent memory filter were made to step down in frequency as by subtracting (instead of adding) the frequency signal $F_s$ during each circulation of the input signal, the additional delay $\tau$ would still be required in the circulating trigger loop because the change of the sign $\omega_s$ in Equation IV is offset by the change in sign of $\delta T$.

If the input signal from source 8 included more than one frequency signal therein such as would be the case if source 8 were the radar return from a moving target and $\omega_0$ the carrier frequency of the radar signal, it can be shown that the total output voltage of the coherent memory filter on line 23 is then defined by Equation V as follows:

Equation V $$V_s = \sum_{K=0}^{m=1} G_K \cos \left\{ (\omega_o + \omega_D + K\omega_s)t - K\omega_o T_o - K\Delta + \left(\frac{K[K-1]}{2}\right) - \left([\omega_o + \omega_D]\frac{\delta T}{m-1} - \omega_s \tau\right) + \left(\frac{K[K-1][2K-1]}{6}\right)\left(\frac{-\omega_s \delta T}{m-1}\right) + \theta_o + K A \right\}$$

wherein $\omega_D$ is the doppler radial frequency due to a moving target and $$\Delta = \omega_D \frac{n}{F_s} + \tau$$

the phase shift from pulse to pulse caused by the target doppler frequency. Under the condition noted in Equation V, $\tau$ is made equal to $$+\left(\frac{\omega_o + \omega_D}{\omega_s}\right)\left(\frac{\delta T}{m-1}\right)$$

in order to cancel the $$K\frac{(K-1)}{2}$$

term.

This completes the description of the spectrum device of the present invention. However, many modifications of the invention will be apparent to persons skilled in the art. For example, as aforerelated, the delay line device 15 of FIG. 1 may be introduced at various points within the circulation trigger loop. Furthermore, instead of selecting a harmonic of the pulse train on line 31, the train of pulses may be coupled directly to an oscillator and used to trigger such oscillator "on" each time a pulse is applied so that the oscillator output signal $F_s$ is of fixed phase value at a certain instant of time during each circulation period. Accordingly, it is desired that this invention not be limited except as defined by the appended claims.

What is claimed is:

1. A coherent memory filter having a circulating trigger loop for deriving a frequency shift signal by recirculating a signal through a closed loop comprising a pulse generator, first and second time delay means, and a trigger detector, and a signal loop for frequency scanning an input signal by recirculating said input signal through a closed loop circuit comprising a vectorial adder, said first time delay means, and a frequency shifter.

2. A coherent memory filter having a circulating trigger loop for deriving a frequency shift signal by recirculating a signal through a closed loop comprising a pulse generator, first means for producing a time delay, and a trigger detector, and a signal loop for frequency scanning an input signal by recirculating said input signal through a closed loop circuit comprising a vectorial adder, second means for producing a time delay, and a frequency shifter, the ratio of the time delay produced in the circulating trigger loop to the time delay produced in the signal loop being greater than unity.

3. In combination:
first and second closed loop circuits connected to common time delay means, said first closed loop circuit responsive to an input signal for providing a signal circulating in said first loop, and said second closed loop circuit including pulse generator means for providing a series of pulses circulating in said second closed loop and separated in time by a time period longer than the circulation time of said first closed loop circuit.

4. In combination:
a first loop circuit responsive to an input signal for circulating a signal through a delay device;
a second loop circuit for providing a frequency offset of the frequency of the signal circulating through said delay device;
and a second delay device in the second loop circuit providing a time delay proportional to variations in time delay due to successively different frequency signals circulating through said delay device.

5. In combination:
a first closed loop circuit responsive to an input signal for providing a signal circulating in said first loop;
a second closed loop circuit for providing a series of circulating pulses separated in time by a time period longer than the circulation time of said first loop;
and means responsive to said series of circulating pulses for frequency offsetting the frequency of the signal circulating in said first loop.

6. In combination:
a first means for frequency scanning an input signal by recirculating said input signal through a closed loop circuit comprising a vectorial adder, a first time delay means and a frequency shifter;
a second means for deriving a frequency shift signal by recirculating a signal through a closed loop comprising a pulse generator, said first time delay means, a trigger detector and a second delay line means;
and means for coupling said frequency shift signal from said second delay line means to said first frequency shifter.

7. In combination:
a first means for frequency scanning an input signal by recirculating said input signal through a closed loop circuit comprising a vectorial adder, a first time delay means and a frequency shifter;
a second means for deriving a frequency shift signal by recirculating a signal through a closed loop comprising a pulse generator, said first time delay means, a trigger detector and a second delay line means; and
means for coupling said frequency shift signal from said second delay line means to said first frequency shifter;
the delay of said second delay line means being proportional to the ratio of the input frequency to the shift frequency times the ratio of the variation in time delay of said first time delay means across the frequency spectrum to the desired number of circulations of the input signal.

8. In combination:
a first means for frequency scanning an input signal by recirculating said input signal through a closed loop circuit comprising a vectorial adder, a first time delay means and a frequency shifter;
a second means for deriving a frequency shift signal by recirculating a signal through a closed loop comprising a pulse generator, said first time delay means, a trigger detector and a second delay line means;
means for coupling said frequency shift signal from said second delay line means to said first frequency shifter;
the delay of said second delay line means being proportional to the variation in time delay of said first time delay means in the frequency spectrum under observation.

9. In combination:
a first circulating loop responsive to an input signal for circulating a signal through a first time delay device;
a second circulating loop coupled to said first circulating loop and offsetting the frequency of said signal circulating through said delay device;
and a second delay device in said second circulating loop for providing a time delay proportional to the variation in time delay of said first time delay device due to the successive offsetting of said signal circulating through said first time delay device.

10. In combination:
a circulating loop circuit responsive to an input signal for circulating a signal through a first time delay device;
a signal loop circuit to provide a frequency offset signal for frequency offsetting the signal circulating through said first time delay device;
a second time delay device in the circulating loop circuit providing a time delay proportional to variations in time delay due to successively different frequency signals circulating through said delay device;
and means for comparing the timing of said signal circulating through the delay device with the frequency of said offset frequency signal to provide a frequency representation of said input signal.

11. In combination:
a first means responsive to an input signal for circulating said input signal through a first delay line device, said first means including means for shifting the frequency of a circulating input signal;
and means for controlling the frequency shift of said circulating input signal including a second delay line device having a time delay greater than the delay time of said first delay line device.

12. In combination:
first and second closed loop circuits having common time delay means for time delaying a signal applied thereto and summing means for vectorially adding signals applied thereto;
said first closed loop circuit including mixer means coupled to said time delay means for frequency offsetting signals from said time delay means and filter means coupled to said mixer means for attenuating signals from above and below a predetermined frequency band, the output of said filter means being coupled to said summing circuit, said second closed loop circuit including detector means coupled to said time delay means and a pulse generator means coupled to said summing means and responsive to trigger pulses from said detector means for producing pulses;
switching means responsive to pulses from said pulse generator means for coupling pulses from said pulse generator means to said summing means and uncoupling input signals from an input source;
oscillator means responsive to pulses from said pulse generator for providing a frequency offset signal to said mixer means;
and an additional time delay means in said second closed loop for delaying pulses circulated through said common delay line means an additional amount so as to shift the frequency of said oscillator means and compensate for variations in the time delay of said common time delay device during successive circulations of input signals through said first loop.

13. In combination:
first and second closed loop circuits having common time delay means for time delaying a signal applied thereto and summing means for vectorially adding signals applied thereto;
oscillator means responsive to pulses from said pulse generator for providing a frequency offset signal to said mixer means;
and an additional time delay means intermediate said common delay line means and said detector means for delaying pulses circulated through said second closed loop circuit an additional amount.

14. In combination:
a first means responsive to an input signal having first and second frequency components for circulating said input signal through a first delay line device, said first means including means for frequency shifting and weighting the circulated signal and for successively summing portions of said input signal with the circulated signal;
means coupled to said delay line device for producing a train of pulses spaced in time a predetermined interval greater than the time delay of said first delay line device;
and oscillator means responsive to said train or pulses for providing a frequency offset signal to said first means.

15. In combination:
a first means responsive to an input signal having first and second frequency components for circulating said input signal through a first delay line device, said first means including means for frequency shifting and weighting the circulated signal and for successively summing portions of said input signal with the circulated signal;
means coupled to said delay line device for producing a train of pulses spaced in time a predetermined interval greater than the time delay of the first delay line device;
oscillator means responsive to said train of pulses for providing a frequency offset signal to said first means;
and means for comparing the timing of said circulated signal with the frequency of said frequency offset signal to provide a frequency representation of the frequency components of said input signal.

References Cited by the Examiner
UNITED STATES PATENTS

| | | | |
|---|---|---|---|
| 2,797,326 | 6/1957 | Putzrath | 333—29 X |
| 2,800,580 | 7/1957 | Davies. | |
| 2,841,704 | 7/1958 | Sunstein et al. | |
| 2,997,650 | 8/1961 | Applebaum | 324—77 |
| 3,060,380 | 10/1962 | Howells et al. | 324—77 |
| 3,206,686 | 9/1965 | Goor | 333—29 X |

RUDOLPH V. ROLINEC, *Primary Examiner.*

WALTER L. CARLSON, *Examiner.*

A. E. RICHMOND, *Assistant Examiner.*

UNITED STATES PATENT OFFICE
CERTIFICATE OF CORRECTION

Patent No. 3,290,591                           December 6, 1966

Roy E. Byington

It is hereby certified that error appears in the above numbered patent requiring correction and that the said Letters Patent should read as corrected below.

Column 5, lines 4, 5, 10, 12 and 32, for "$\varpi$", each occurrence, read -- $\omega$ --.

Signed and sealed this 26th day of September 1967.

(SEAL)
Attest:

ERNEST W. SWIDER
Attesting Officer

EDWARD J. BRENNER
Commissioner of Patents